(12) United States Patent
Gurvich

(10) Patent No.: US 11,892,030 B2
(45) Date of Patent: Feb. 6, 2024

(54) COMPOSITE BEAM JOINT WITH WEDGE-SHAPED INNER AND OUTER LOCKING FEATURES

(71) Applicant: CROMPTON TECHNOLOGY GROUP LIMITED, Banbury (GB)

(72) Inventor: Mark R. Gurvich, Middletown, CT (US)

(73) Assignee: CROMPTON TECHNOLOGY GROUP LIMITED, Banbury (GB)

(*) Notice: Subject to any disclaimer, the term of this patent is extended or adjusted under 35 U.S.C. 154(b) by 663 days.

(21) Appl. No.: 16/784,868

(22) Filed: Feb. 7, 2020

(65) Prior Publication Data

US 2021/0245864 A1   Aug. 12, 2021

(51) Int. Cl.
*F16D 1/02* (2006.01)
*F16D 1/06* (2006.01)
(Continued)

(52) U.S. Cl.
CPC .............. *F16B 7/042* (2013.01); *B64C 25/34* (2013.01); *F16D 1/02* (2013.01); *F16D 1/06* (2013.01)

(58) Field of Classification Search
CPC ...... F16B 7/0406; F16B 7/0413; F16B 7/042; F16B 2200/406; F16B 2200/506;
(Continued)

(56) References Cited

U.S. PATENT DOCUMENTS 3,623,261 A * 11/1971 Freese ........................ E04B 1/54
403/345
3,778,185 A   12/1973 Plowman et al.
(Continued)

FOREIGN PATENT DOCUMENTS

CA         2925672 A1 * 10/2016 ............. B29C 65/02
CN     115884845 A  *  3/2023
(Continued)

OTHER PUBLICATIONS

European Search Report Issued in European Application No. 21155870. 5-1017 dated Jun. 22, 2021; 10 Pages.

*Primary Examiner* — Amber R Anderson
*Assistant Examiner* — Zachary A Hall
(74) *Attorney, Agent, or Firm* — CANTOR COLBURN LLP

(57) ABSTRACT

Disclosed is a composite beam structure having: an end piece, an end piece outer periphery surface, and an end piece mating end defining an end piece axial boundary, the end piece includes wedge-shaped inner locking features that are formed to project outwardly from the end piece outer periphery surface at the end piece mating end and are spaced apart from one another in the hoop direction; and a composite tube configured to surround at least a portion of the end piece mating end to form a beam joint, wedge-shaped imprints are formed through the composite tube, corresponding to the wedge-shaped inner locking features, the wedge-shaped imprints define respective composite tube wedge-shaped depression surfaces about a composite tube inner periphery and composite tube wedge-shaped boss surfaces about a composite tube outer periphery, and the wedge-shaped inner locking features of the end piece are covered by the composite tube wedge-shaped depression surfaces.

21 Claims, 9 Drawing Sheets

(51) Int. Cl.
*F16B 7/04* (2006.01)
*B64C 25/34* (2006.01)

(58) Field of Classification Search
CPC .... F16B 2200/509; F16C 3/023; F16C 3/026; F16C 7/026; F16D 1/033; F16D 1/076; F16D 1/0876; F16D 1/0882; F16D 1/0888; Y10T 403/4966; Y10T 403/5773; Y10T 403/5781; Y10T 403/5793; Y10T 403/70; Y10T 403/7045; Y10T 403/7069
See application file for complete search history.

(56) References Cited

U.S. PATENT DOCUMENTS

| | | | | |
|---|---|---|---|---|
| 4,523,872 A | * | 6/1985 | Arena | F16D 1/072 403/292 |
| 5,288,109 A | | 2/1994 | Auberon et al. | |
| 5,553,964 A | * | 9/1996 | Rouillot | F16C 3/026 464/181 |
| 6,352,385 B1 | * | 3/2002 | Wojciechowski | F16D 1/033 403/364 |
| 6,855,061 B2 | * | 2/2005 | Simboli | F16D 1/068 464/182 |
| 10,634,473 B2 | * | 4/2020 | Travis | F42B 15/36 |
| 11,396,904 B2 | * | 7/2022 | Schaefer | F16D 1/068 |
| 2017/0198734 A1 | | 7/2017 | Bernard et al. | |
| 2018/0163761 A1 | | 6/2018 | Gurvich et al. | |
| 2019/0017538 A1 | | 1/2019 | Gurvich et al. | |
| 2019/0376543 A1 | | 12/2019 | Gurvich et al. | |

FOREIGN PATENT DOCUMENTS

| | | | | |
|---|---|---|---|---|
| DE | 102008017679 A1 | * | 10/2009 | ............ B60K 17/22 |
| DE | 102015225180 A1 | * | 6/2017 | |
| EP | 2229540 A1 | | 9/2010 | |
| EP | 3133298 A1 | | 2/2017 | |
| EP | 3427927 A1 | | 1/2019 | |
| WO | 2021046310 A1 | | 3/2021 | |

* cited by examiner

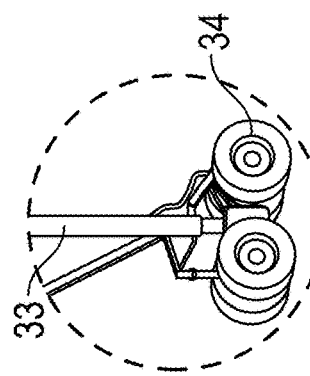
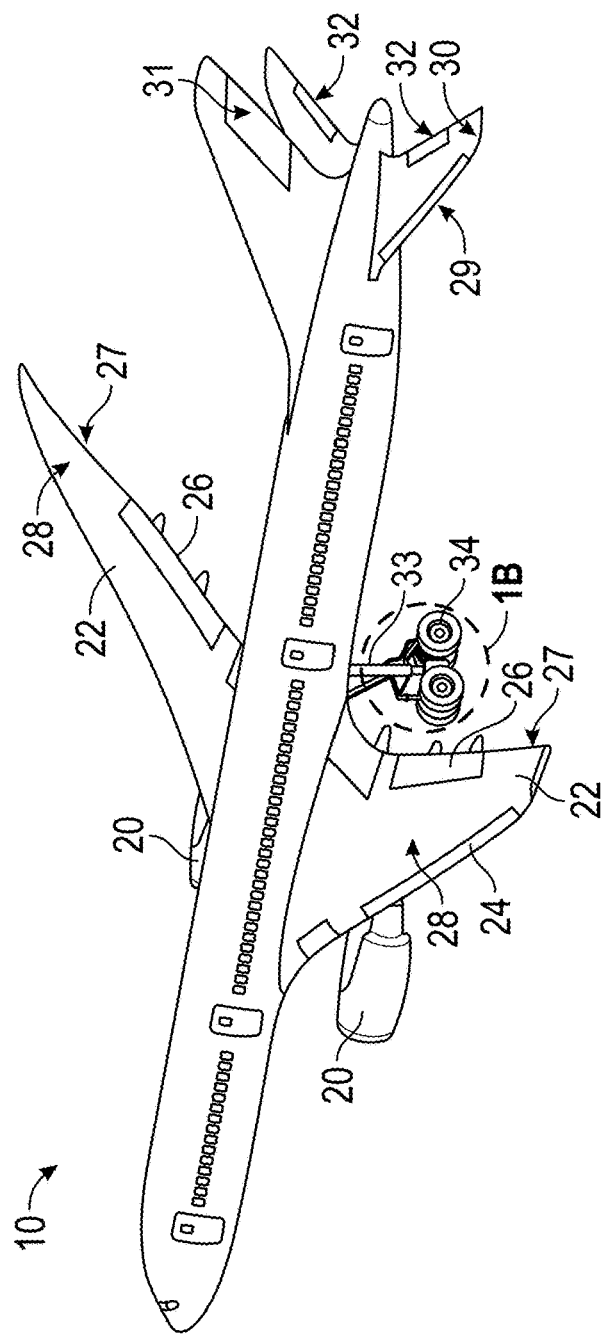

COMPOSITE BEAM JOINT WITH WEDGE-SHAPED INNER AND OUTER LOCKING FEATURES

BACKGROUND

The disclosed embodiments related to composite beams joints and more specifically to a composite beam joint with wedge-shaped inner and outer locking features.

Many components in the aircraft may be in part supported with or controlled by actuators and linkages that utilize composite beams for efficient load transfer. High tensile properties of composite materials in a fiber direction make such materials extremely promising for aerospace applications such as actuators and linkages. Reliably transferring complex loads (axial, torsional, and bending), however, may be a challenge at beam joints of the composite beams, such as where a composite beam is joined with an end piece formed of metal.

BRIEF SUMMARY

Disclosed is a method of manufacturing a composite beam structure including: positioning an end piece on a mandrel, wherein the end piece has an axis, an end piece outer periphery surface, and an end piece mating end, wherein the end piece includes wedge-shaped inner locking features that are formed to project outwardly from the end piece outer periphery surface at the end piece mating end and are spaced apart from one another; and positioning a composite tube on the mandrel so that the composite tube surrounds at least a portion of the end piece mating end to form a beam joint; clamping the composite tube against the end piece mating end to form wedge-shaped imprints through the composite tube, corresponding to the wedge-shaped inner locking features on the end piece mating end, wherein the wedge-shaped imprints respectively define composite tube wedge-shaped depression surfaces about a composite tube inner periphery and composite tube wedge-shaped boss surfaces about a composite tube outer periphery, and wherein the wedge-shaped inner locking features of the end piece are covered by the composite tube wedge-shaped depression surfaces; and removing the composite beam structure and the mandrel from one another upon curing for thermoset or solidifying for thermoplastic composite materials, respectively.

In addition to one or more of the above aspects or as an alternate, the method further includes securing an end cap to the end piece so that wedge-shaped outer locking features of the end cap are configured to abut adjacent ones of the composite tube wedge-shaped boss surfaces, wherein the wedge-shaped outer locking features are connected to one another by a collar portion of the end cap.

In addition to one or more of the above aspects or as an alternate positioning the composite tube on the mandrel includes: positioning an insert over the mating end of the end piece; forming the composite tube over the mandrel and the insert; and removing the insert prior to clamping the composite tube against the end piece mating end.

Further disclosed is a composite beam structure including: an end piece having an axis, an end piece outer periphery surface, and an end piece mating end defining an end piece axial boundary, wherein the end piece includes wedge-shaped inner locking features that are formed to project outwardly from the end piece outer periphery surface at the end piece mating end and are spaced apart from one another in the hoop direction; and a composite tube configured to surround at least a portion of the end piece mating end to form a beam joint, wherein wedge-shaped imprints are formed through the composite tube, corresponding to the wedge-shaped inner locking features, wherein the wedge-shaped imprints define respective composite tube wedge-shaped depression surfaces about a composite tube inner periphery and composite tube wedge-shaped boss surfaces about a composite tube outer periphery, and wherein the wedge-shaped inner locking features of the end piece are covered by the composite tube wedge-shaped depression surfaces.

In addition to one or more of the above aspects or as an alternate each of the wedge-shaped inner locking features is triangular having a vertex surface portion that is disposed along the axis and is directed away from the end piece axial boundary at the end piece mating end.

In addition to one or more of the above aspects or as an alternate each of the wedge-shaped inner locking features is configured as an isosceles triangle, oriented such that it is bisected by the axis to define first and second triangular surfaces.

In addition to one or more of the above aspects or as an alternate the end piece and the composite tube are formed of different materials.

In addition to one or more of the above aspects or as an alternate the end piece is formed of metal or alloy or their combination.

In addition to one or more of the above aspects or as an alternate the end piece and the composite tube each have circular cross-sections.

In addition to one or more of the above aspects or as an alternate the end piece and the composite tube each have polygonal cross-sections, such as, for example, triangular, square, pentagonal, hexagonal, or other closed-shape contours In addition to one or more of the above aspects or as an alternate the end piece extends from the end piece mating end to an axial exterior end; and a mechanical connector is secured to the axial exterior end.

In addition to one or more of the above aspects or as an alternate, the composite beam structure further includes an end cap that is secured to the composite tube outer periphery of the composite tube at the beam joint, wherein: the end cap is formed with wedge-shaped outer locking features connected to one another by a collar portion; and the wedge-shaped outer locking features are configured to abut adjacent ones of the composite tube wedge-shaped boss surfaces.

In addition to one or more of the above aspects or as an alternate the end cap is formed from metal or alloy or their combination.

In addition to one or more of the above aspects or as an alternate the wedge-shaped outer locking features define an end cap outer boundary of the end cap so that the end cap is discontinuous in the hoop direction about its perimeter along the beam joint.

In addition to one or more of the above aspects or as an alternate the end cap is continuous around its perimeter along the beam joint and has a complementary cross section shape to the composite tube outer periphery about the beam joint.

In addition to one or more of the above aspects or as an alternate the wedge-shaped inner locking features define the end piece axial boundary along the beam joint, so that the end piece is discontinuous in the hoop direction about its perimeter along the beam joint.

In addition to one or more of the above aspects or as an alternate the wedge-shaped inner locking features define the end piece axial boundary along the beam joint, so that the end piece is discontinuous in the hoop direction about its perimeter along the beam joint.

In addition to one or more of the above aspects or as an alternate the end cap is fastened to the end piece at a location that is spaced apart from the end piece mating end.

In addition to one or more of the above aspects or as an alternate the end cap is fastened to the end piece with fasteners, such as for example, a nut and bolt connection or rivets, therebetween.

In addition to one or more of the above aspects or as an alternate the composite tube is formed of a material selected from one or more reinforced carbon, glass, and organic fibers, wherein the composite material is thermoset or within a thermoplastic polymeric matrix.

BRIEF DESCRIPTION OF THE DRAWINGS

The following descriptions should not be considered limiting in any way. With reference to the accompanying drawings, like elements are numbered alike:

FIG. 1A is a perspective view of an aircraft that includes aerodynamic surfaces where embodiments of the present invention can be implemented;

FIG. 1B is a close of up landing gear taken at section 1B in FIG. 1A;

DETAILED DESCRIPTION

Figure 2:
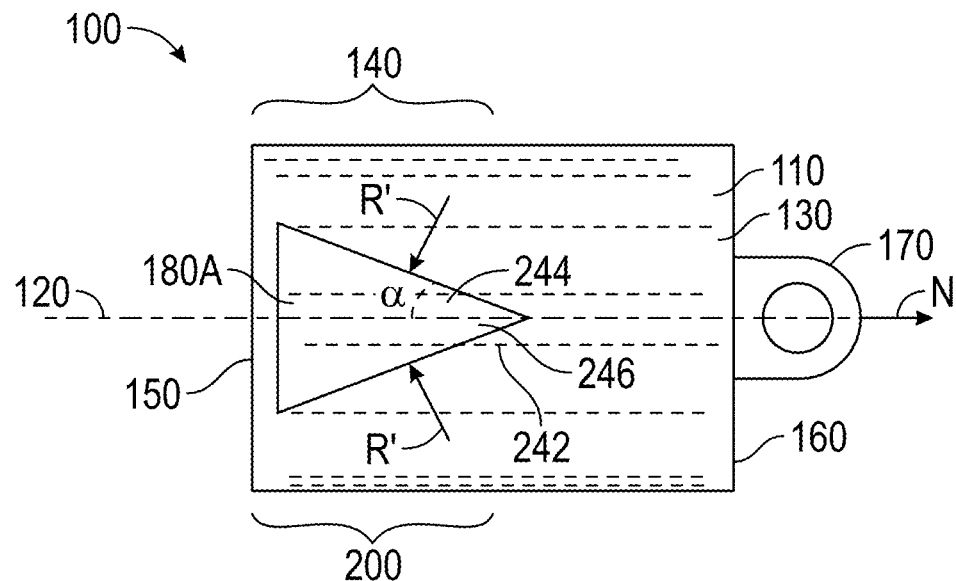
FIG. 2 shows a side view of an end piece of a composite beam end according to an embodiment.

A detailed description of one or more embodiments of the disclosed apparatus and method are presented herein by way of exemplification and not limitation with reference to the Figures.

FIGS. 1A and 1B illustrate an example of a commercial aircraft (aircraft) 10 having aircraft engines surrounded by (or otherwise carried in) a nacelles 20. The aircraft 10 includes two wings 22 that can each include one or more slats 24 and one or more flaps 26. The aircraft may further include ailerons 27, spoilers 28, horizontal stabilizer trim tabs 29, horizontal stabilizer 30 and rudder 31, and vertical stabilizer 32 (the tail structure being collectively referred to as an and empennage), and landing gear systems 33 (that include wheels 34) each of which may be typically referred to as "control surfaces" as they are movable under aircraft power systems.

As indicated, the above-mentioned components in the aircraft 10 along with other components (e.g., landing gear systems) may be in part supported with or controlled by actuators and linkages that can utilize composite beams. Reliably transferring complex loads (axial, torsional, and bending), may be a challenge at beam joints of the composite beams.

Figure 3:
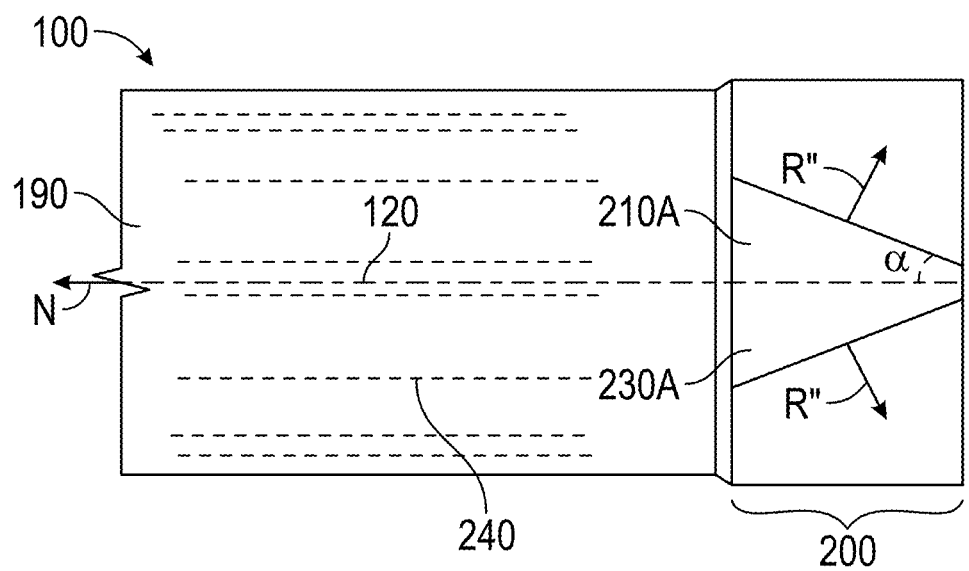
FIG. 3 shows a side view of a composite tube of a composite beam end according to an embodiment.
Figure 4:
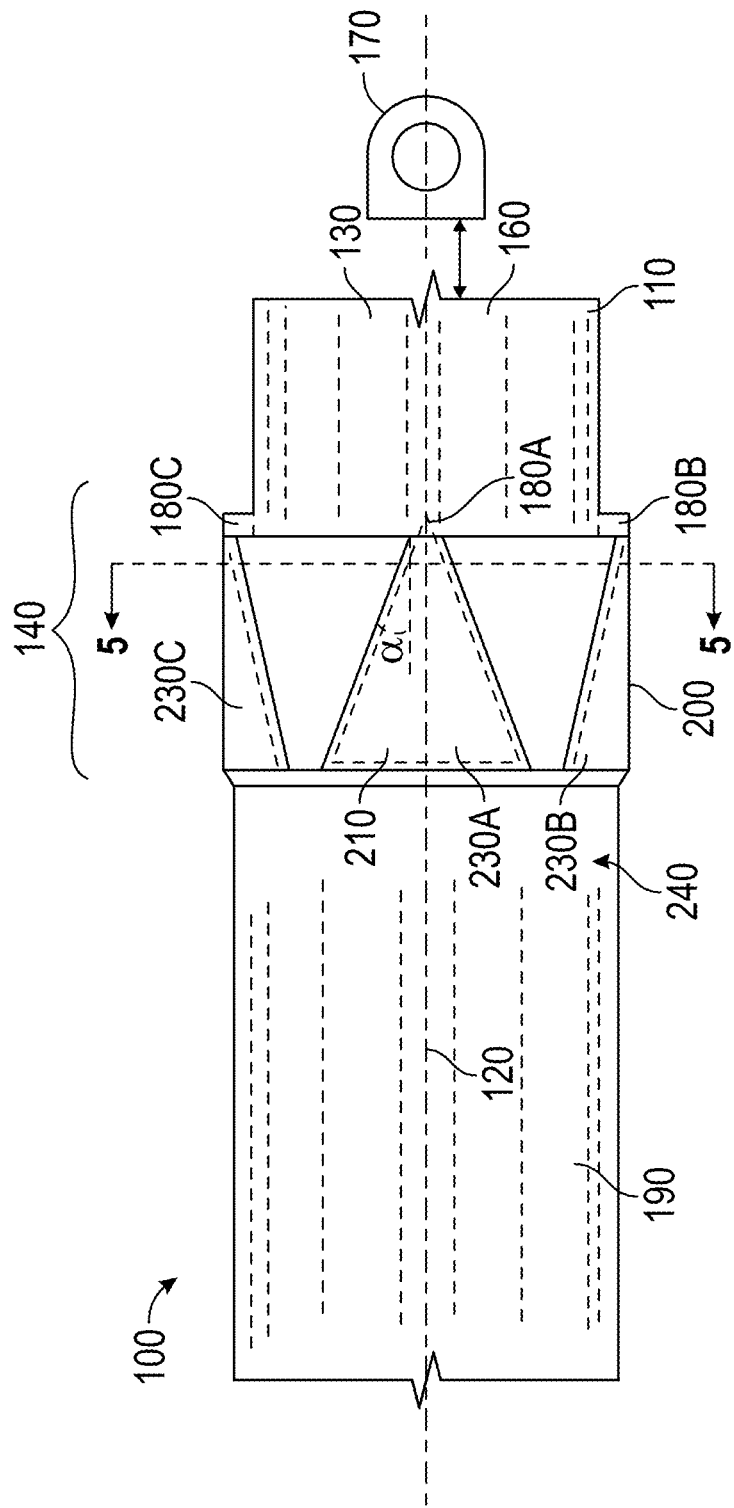
FIG. 4 shows a side view of a composite beam end according to an embodiment.
Figure 5:
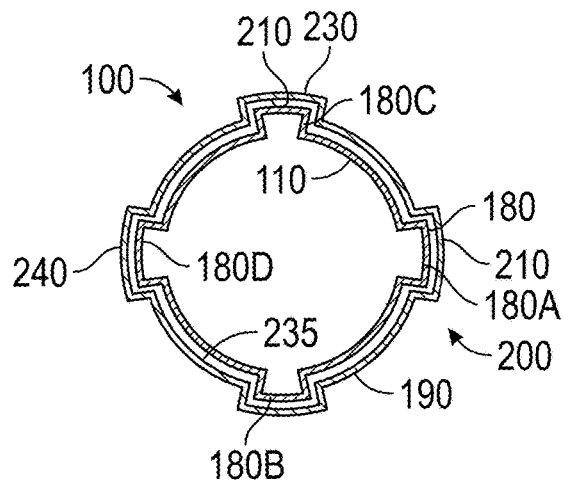
FIG. 5 shows a diametric cross section of a composite beam end according to an embodiment along section lines A-A in FIG. 4.

Turning to FIGS. 2-5, a composite beam structure (beam structure) 100 (FIGS. 4 and 5) is shown. FIGS. 2-4 show side views, and FIG. 5 shows a diametric cross-section. In one embodiment, the structure is utilized in an aircraft such as the aircraft of FIGS. 1A-1B. An end piece 110 (shown in FIGS. 2 and 4-5) of the beam structure 100 has an axis 120, an end piece outer periphery surface 130 and a mating end 140 defining an end piece axial boundary (or axial end edge) 150. The end piece 110 extends axially from the end piece mating end 140 to an axial exterior end 160. A mechanical connector 170 (shown in FIGS. 2 and 4) is secured to the axial exterior end 160. The mechanical connector 170 may be an eyelet. The eyelet may be connected to a movable aircraft component, such as, for example, a control surface, for deploying or retracing the control surface. The end piece 110 includes end piece wedge-shaped inner locking features 180 (for simplicity, a single locking feature 180A is shown in FIG. 2, three locking features 180A-180C are shown, partially in hidden lines, in FIG. 4, and four locking features 180A-180D are show in FIG. 5)), which are end piece wedge-shaped bosses that are formed on the end piece outer periphery surface 130 at the end piece mating end 140 and spaced apart from one another. There can be more than one locking features 180 distributed in the hoop direction around the end piece 110. The end piece 110 is formed of a material that resists deformation under rotational and translational forces, which may be metal, alloy or other materials similarly satisfying corresponding strength criteria.

The beam structure 100 includes a composite tube 190 (shown in FIGS. 2-5) that is formed of a material selected from one or more reinforced carbon, glass, and organic fibers or any of their combination, within either thermoset or thermoplastic polymeric matrix. The composite tube 190 is configured to surround at least a portion of the end piece mating end 140 to form a beam joint 200. Wedge-shaped imprints 210 (a single imprint 210A is shown in FIG. 3), corresponding to the wedge-shaped inner locking features 180 on the end piece mating end 140, are formed through the composite tube 190. The wedge-shaped imprints 210 define respective composite tube wedge-shaped depression surfaces 220 (FIG. 5) about a composite tube inner periphery 235 (FIG. 5) and composite tube wedge-shaped boss surfaces 230 (a single composite tube wedge-shaped boss surfaces 230A is shown in FIG. 3, and three composite tube wedge-shaped boss surfaces 230A-230C are illustrated in part in FIG. 4) about a composite tube outer periphery 240. The wedge-shaped inner locking features 180 of the end piece 110 are covered by the composite tube wedge-shaped depression surfaces 220. A number of imprints 210 corresponds to a similar number of locking features 180.

As labeled in FIG. 2, each of the wedge-shaped inner locking features 180 is triangular having a vertex surface portion 242 that is disposed along the axis 120 and is directed away from the end piece axial boundary 150 of the end piece mating end 140 of the end piece 110. More specifically, each of the wedge-shaped inner locking features 180 is configured as an isosceles triangle, oriented such that it is bisected by the axis 120. This configuration defines a first right triangular surface 244 and a second right triangular surface 246 oriented at an angle alpha ($\propto$) to the axis 120. The angle alpha ($\propto$) defines reaction forces R', normal to the first right triangle surface 24 and the second right triangular surface 246. These reactions R' are shown on example of applied external tension load N (FIG. 2). R'' are corresponding reactions to forces R' at composite tube 190 (FIG. 3), equal to R' but directed in respectively opposite directions. Forces are reacted along the reaction axes R' that otherwise tend to pull the end piece 110 and composite tube 190 from one another or cause the same to rotate relative to one another. The angle alpha ($\propto$), number of locking features 180 and their sizes, and thus the reaction forces R', may be determined based on material characteristics and load conditions, to optimize a redistribution of such forces. This configuration minimizes a likelihood of mutual movement of composite tube 190 and end piece 110 under expected load conditions, such as axial, torsional and bending loads. It also reduces risks of execs stress and strain on the composite tube 190 within the beam joint 200 and surrounding structural areas. For reference purposes, force vector N is illustrated in FIGS. 2 and 3, acting along opposing directions and at opposing ends of the beam structure 100. The vector N has the same value in either direction due to equilibrium conditions.

Figure 6:
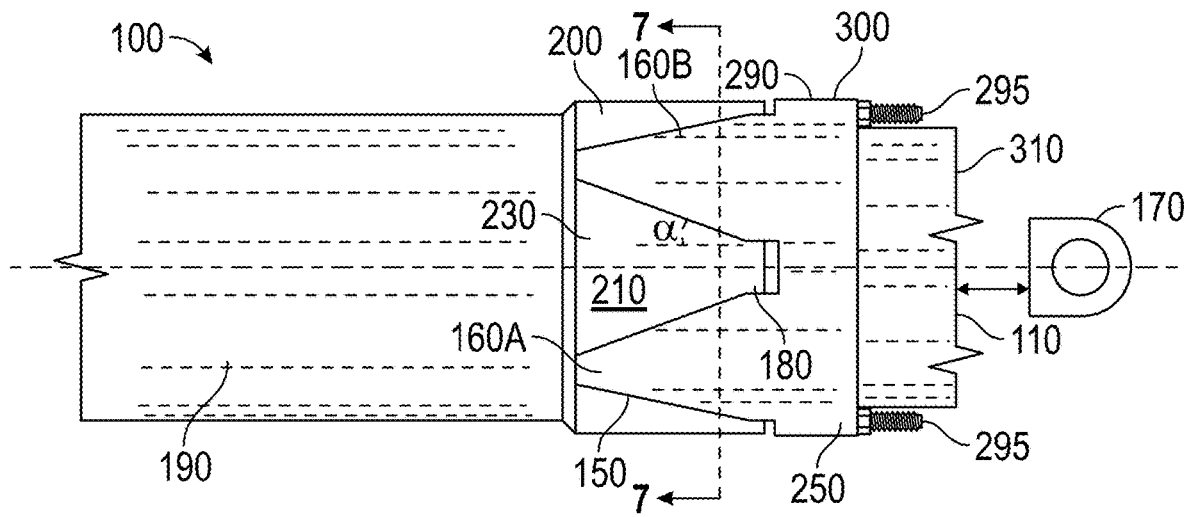
FIG. 6 shows a side view of a composite beam end according to an embodiment where a composite tube, an end piece and an end cap are shown.
Figure 7:
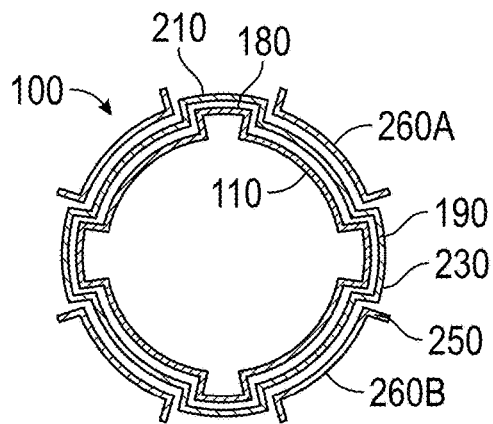
FIG. 7 shows a diametric cross section of a composite beam end according to an embodiment along section lines B-B of FIG. 7.

As shown in FIGS. 6-7, again shown is the end piece 110 and the composite tube 190 of FIGS. 2-5. FIGS. 6 and 7 show a side and a diametric cross-sectional views respectively. The wedge-shaped inner locking features 180, the wedge-shaped imprints 210 that define the composite tube wedge-shaped boss surfaces 230, the end piece axial boundary 150 (FIG. 6) of the end piece 110, and the mechanical connector 170 (illustrated schematically in FIG. 6) are also identified.

An end cap 250 is secured to the composite tube outer periphery 240 at the beam joint 200. The end cap 250 is formed with wedge-shaped outer locking features 260A, 260B. The wedge-shaped outer locking features 260A, 260B abut adjacent ones of the composite tube wedge-shaped boss surfaces 230. The wedge-shaped outer locking features 260 are connected to one another by a collar portion 290 of the end cap 250 that surrounds the end piece 110. The collar portion 290 is adjacent to the beam joint 200. The end cap 250 is made of a material that resists deforming under rotational, and/or axial and/or bending loads. The end cap 250 is formed of, for example, metal or alloy, which may be the same or different material as the end piece 110. The end cap 250 is fastened to the end piece 110 with a fastener 295, which may be, for example, a nut and bolt connector, i.e., providing a nut and bolt connection therebetween. Number of such fasteners can be defined by, for examples, strength based criteria. The end cap 250 is fastened to the end piece 110 at a location that is spaced apart from the beam joint 200. In one embodiment an axial free end of the end cap 250 is fastened to an axial free end 310 of the end piece 110, i.e., spaced apart along the axis 120 from the end piece axial boundary 150.

With the disclosed configuration of FIGS. 6-7, loads generated when attempting to rotate or translate the end piece 110 and the composite tube 190 relative to one another are reacted between the end piece 110 and the end cap 250. As such, the loads will minimize the possibility of deforming the composite tube 190. As indicated, the configuration of the wedge-shaped inner and outer locking features 180, 260 may be modified by changing the angle alpha ($\propto$) defined by the first and second right triangular surfaces 244, 246 relative to the axis 120.

Figure 8A:
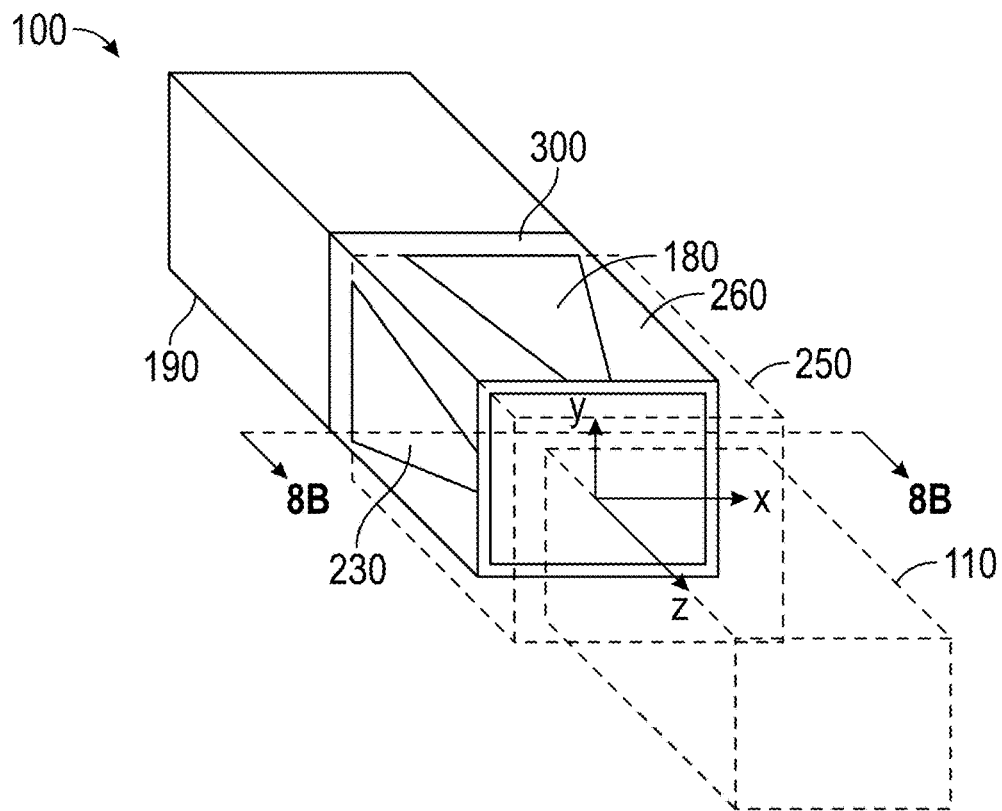
FIG. 8A shows a 3D side view of a composite beam end according to an embodiment where a composite tube is shown and an end piece and end cap are schematically illustrated.
Figure 8B:
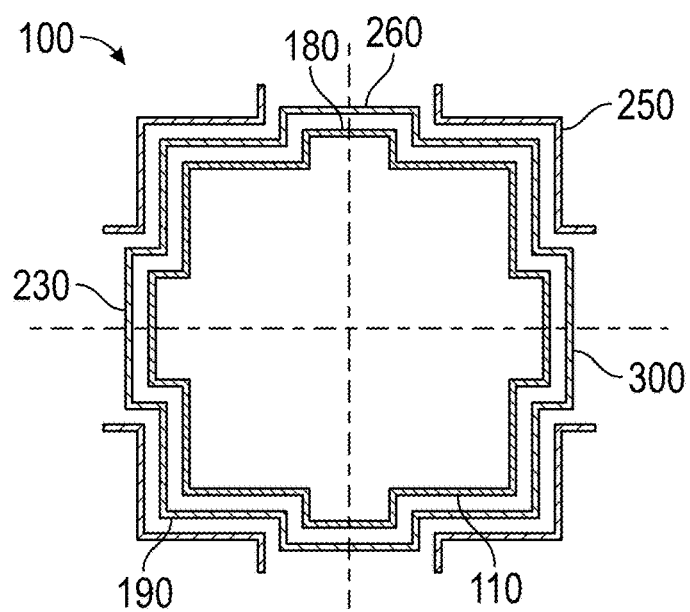
FIG. 8B shows a cross sectional view of a composite beam end according to an embodiment along section lines C-C of FIG. 8A.

In the illustrated embodiments of FIGS. 6-7, the cross-sectional shape of the beam structure 100 is circular. However, the shape could also be square or other polygonal shape (triangular, pentagonal, hexagonal, etc.) or other closed-contour shape. For example, FIGS. 8A-8B show a square version of the beam structure 100. The composite tube 190 is shown, and the end piece 110 and end cap 250 are illustrated schematically. At least two sets of wedge-shaped inner and outer locking features 180, 260 will react the rotational and translational forces, though a greater or lesser number of sets of the wedge-shaped inner and outer locking features 180, 260 is within the scope of the disclosure. For example, the wedge-shaped inner and outer locking features 180, 260 may be on each planar surface 300 of a square or other polygonal shape.

Figure 10:
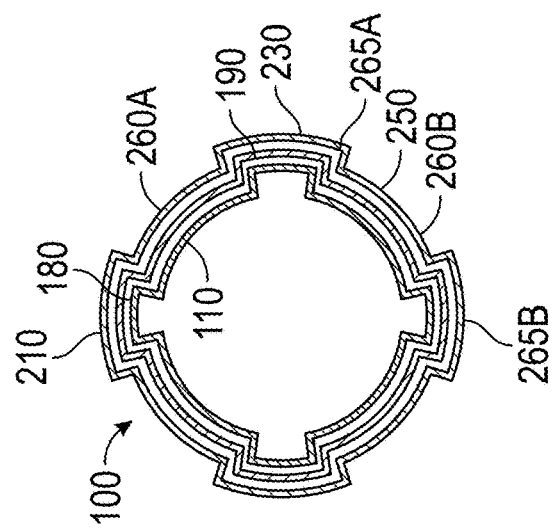
FIG. 10 shows a diametric cross section of the composite beam end of FIG. 9 along section lines B1-B1.
Figure 9:
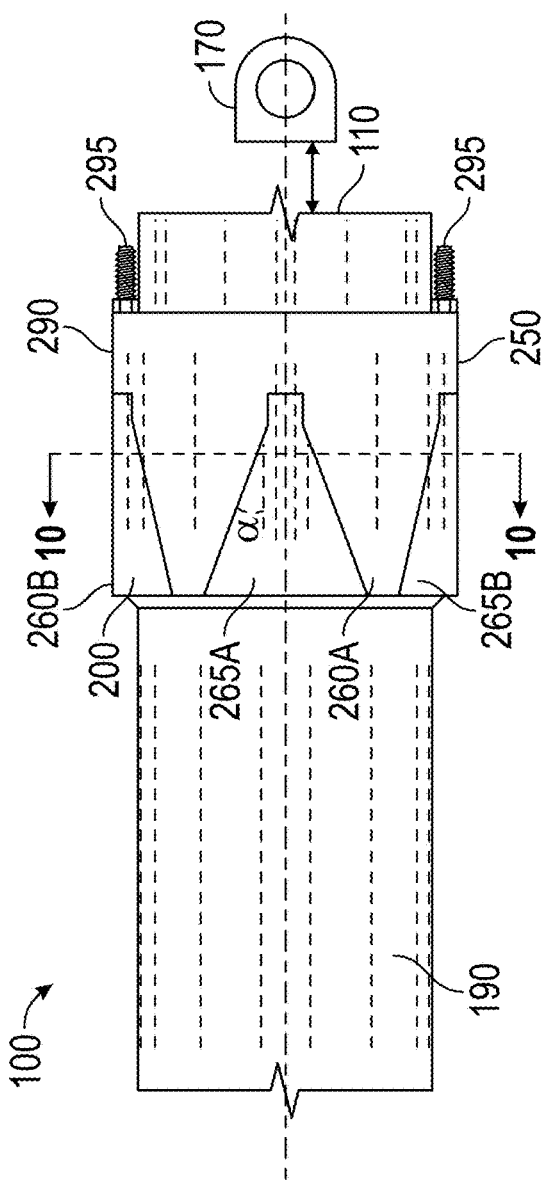
FIG. 9 shows a side view of a composite beam end according to an embodiment where a composite tube, an end piece and an end cap are shown, and the end cap is circumferentially continuous.

In the illustrated embodiment of FIGS. 6-7, the end cap 250 is discontinuous in the hoop direction between the boss surfaces 280 about its perimeter along the beam joint 200. That is, the wedge-shaped outer locking features 180, 260 define an end cap outer boundary for the end cap 250. FIGS. 9-10 show a version of the end cap 250 that is continuous about the perimeter of the beam joint 200. FIGS. 9 and 10 show side and diametric cross-sectional views, respectively. Shown in these figures is the composite tube 190, the end piece 110 and the end cap 250 and the fastener 295 (FIG. 9) of the beam structure 100. The end cap 250 has a complementary cross section shape to the composite tube outer periphery 240 about the beam joint 200. Thus the end cap 250, axially adjacent to the collar 290, includes the end cap wedge-shaped outer locking features 160A, 160B, which are shaped as wedge-shaped depression surfaces. In addition, interspaced between the end cap wedge-shaped outer locking features 260A, 260B are end cap wedge-shaped boss surfaces 265 (two of the end cap wedge-shaped boss surfaces 265A, 265B are labeled). In the embodiment of FIG. 10, the inner locking features 160, the composite tube boss surfaces 230 and the end cap boss surfaces 265 are circumferentially aligned and radially layered against one another.

Figure 11:
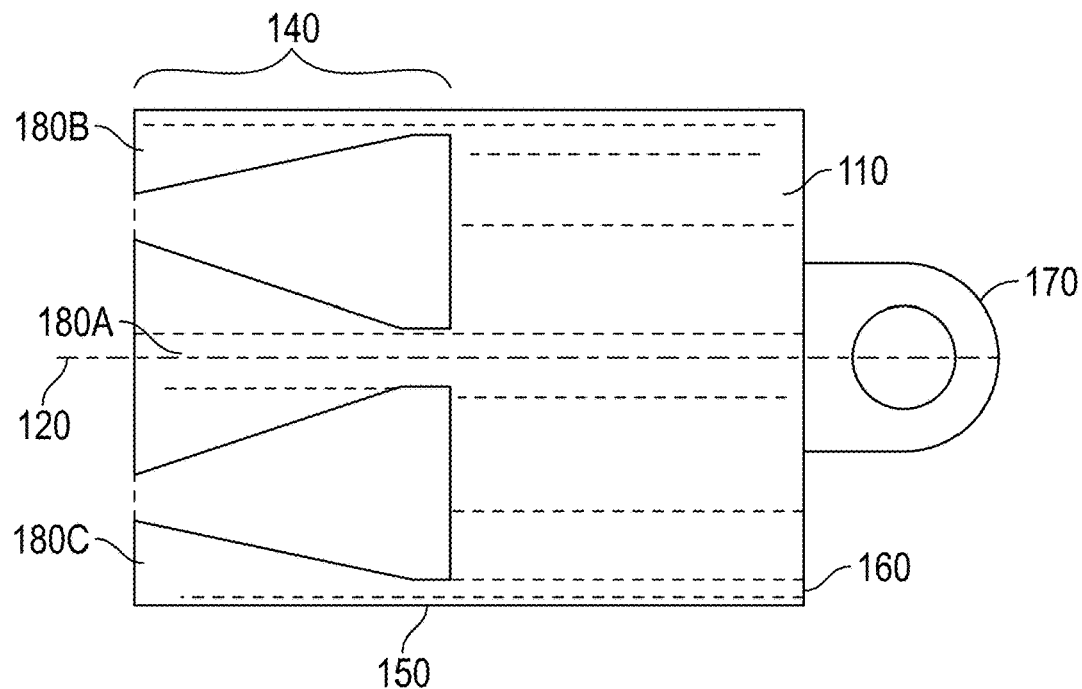
FIG. 11 shows a side view of an end piece according to another embodiment.

In the illustrated embodiment of FIGS. 6-7, the end piece 110 is continuous about its perimeter between the wedge-shaped inner locking features 180 along the beam joint 200. FIG. 11 shows a side view of a version of the end piece 110 that is discontinuous about its perimeter between the wedge-shaped inner locking features 180 (three wedge-shaped locking features 180A-180C are labeled). That is, the wedge-shaped inner locking features 180 define the end piece axial boundary 150 at the mating end 140. Further labeled in FIG. 11 is the axis 120 and the mechanical connector 170 at the axial exterior end 160, the locking features 180 (a single locking feature 180A is shown).

Figure 12:
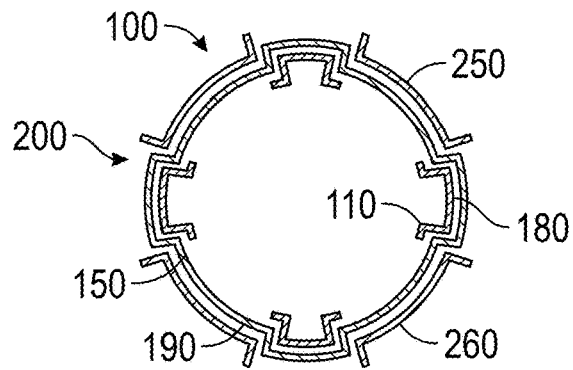
FIG. 12 shows a diametric cross section of a composite beam having the end piece of FIG. 11 and the composite tube and end cap of FIG. 6, where the cross section is along section lines B-B of FIG. 6.
Figure 13:
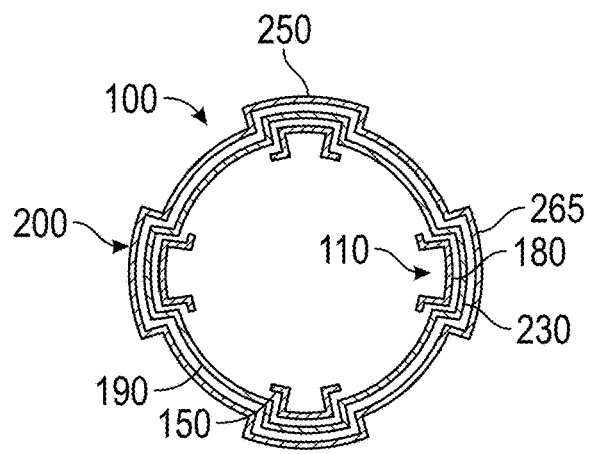
FIG. 13 shows a diametric cross section of a composite beam having the end piece of FIG. 11 and the composite tube and end cap of FIG. 9, where the cross section is along section lines B-B of FIG. 9.

FIG. 12 shows an embodiment in which the end piece of FIG. 11 is mated with the composite tube 190 and the end cap 250 as shown in FIG. 7. Thus FIG. 12 shows an alternate version of section B-B of FIG. 7. FIG. 13 shows an embodiment in which the end piece of FIG. 11 is mated with the composite tube 190 and the end cap 250 as shown in FIG. 9. Thus FIG. 13 shows an alternate version of section B1-B1 of FIG. 9. Both FIGS. 12 and 13 represent diametric cross-sectional views. Each of these figures illustrates the beam joint 200 of the beam 100, the end piece 100, the end piece boundary 150 formed by the embodiment of the end piece illustrated in FIG. 11, the composite tube 190 and the end cap 250. In the embodiment of FIG. 12, the inner locking features 180 and the outer locking features 260 circumferentially alternate with one another. In the embodiment of FIG. 13, as with the embodiment of FIG. 10, the inner locking features 160, the composite tube boss surfaces 230 and the end cap boss surfaces 265 are circumferentially aligned and radially layered against one another.

Figure 14:
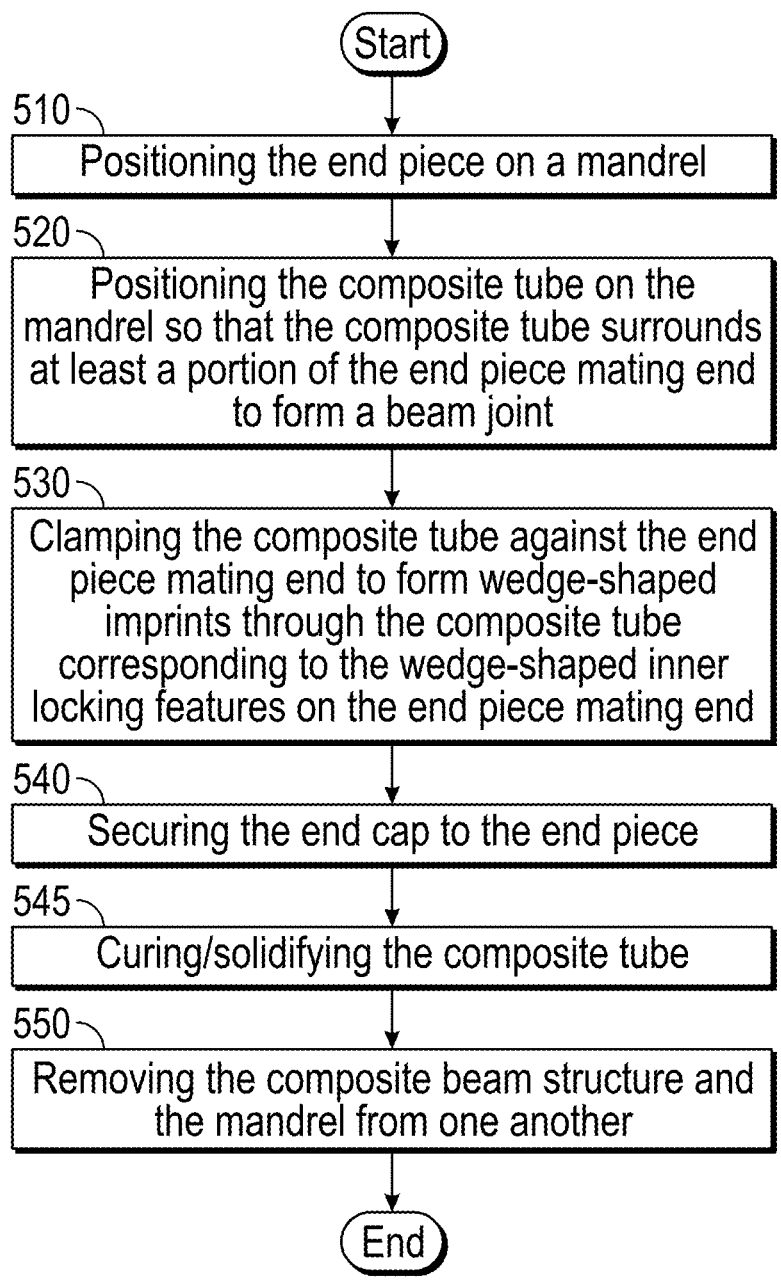
FIG. 14 is a flow chart showing a method of manufacturing a composite beam according to an embodiment.
Figure 15:
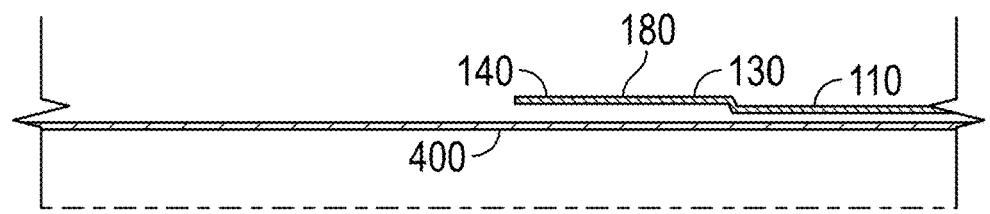
FIG. 15 shows an axial cross-sectional view of a configuration of the composite beam end at one step of the method shown in FIG. 14, where an end piece is positioned on a mandrel.

With reference to FIG. 14, a flow chart shows a method of manufacturing a composite beam structure. FIGS. 15-18 show axial cross-sectional views. As shown in block 510 (FIG. 14) and further shown in FIG. 15, the method includes positioning the end piece 110 on a mandrel 400. As indicated, the end piece 110 has an end piece outer periphery surface 130, and a mating end 140. The end piece 110 includes wedge-shaped inner locking features 180 that are formed to project outwardly on the end piece outer periphery surface 130 at the end piece mating end 140 and are spaced apart from one another.

Figure 16:
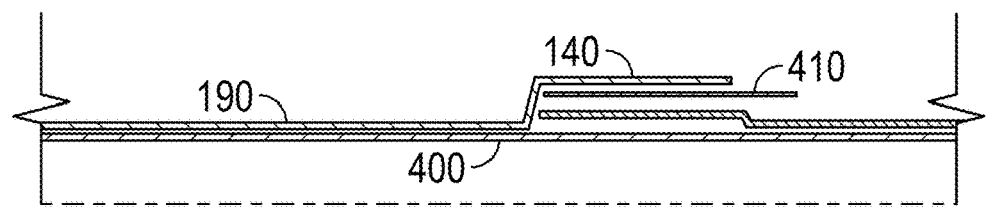
FIG. 16 shows an axial cross-sectional view of a configuration of the composite beam end at another step of the method shown in FIG. 14, where a composite tube is positioned against a mating end of the end piece on the mandrel.

As shown in block 520 (FIG. 14) and further shown in FIG. 16, the method includes positioning an insert 410 about the mating end 140 for the end piece 110 and positioning the composite tube 190 on the mandrel 400 so that the composite tube 190 surrounds at least a portion of the end piece mating end 140, with the insert 410 therebetween, to form a beam joint 200. The insert 410 provides spacing for the forming the composite tube 190 around the mandrel 400 and the end piece 110, e.g., by different appropriate methods of making composite tubes, such as, among others, by filament-winding (as one example) or automated fiber placing (AFP) (as another example). The insert 410 is removed once the composite tube 190 is formed. The insert 410 is optional and can be avoided if there is sufficient room for forming the composite mating end 140.

Figure 17:
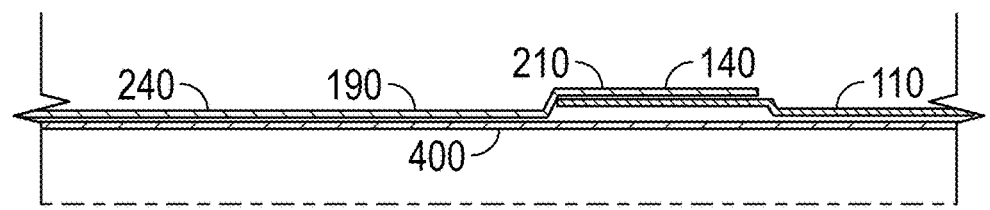
FIG. 17 shows an axial cross-sectional view of a configuration of the composite beam end at a further step of the method shown in FIG. 14, where the composite tube is secured to the end piece at the end piece mating end of the end piece.

As shown in block 530 (FIG. 14) and further shown in FIG. 17, the method includes clamping the composite tube 190 against the end piece mating end 140 to form wedge-shaped imprints 210 through the composite tube 190 corresponding to the wedge-shaped inner locking features 180 on the end piece mating end 140. As indicated the wedge-shaped imprints 210 define composite tube wedge-shaped depression surfaces 220 about the composite tube inner periphery 235 (FIG. 6) and composite tube wedge-shaped boss surfaces 230 (FIG. 6) about the composite tube outer periphery 240. As indicated, the wedge-shaped inner locking features 180 on the end piece mating end 140 are covered by the composite tube wedge-shaped depression surfaces 220. If thermoplastic composite materials are used for the composite tube 190, clamping devices can be heated for better manufacturability. Once the composite tube 190 is cured for thermoset composite materials or solidified for thermoplastic composite materials (shown in block 545), any clamping implements may be removed.

Figure 18:
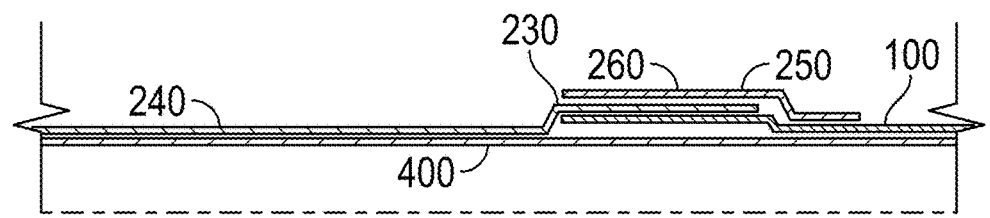
FIG. 18 shows an axial cross-sectional view of a configuration of the composite beam end at an addition step of the method shown in FIG. 14, where the end cap is secured to the composite beam.

As shown in block 540 (FIG. 14) and further shown in FIG. 18, the method includes securing the end cap 250 to the end piece 110. With this configuration, wedge-shaped outer locking features 260 of the end cap 250 abut adjacent ones of the composite tube wedge-shaped boss surfaces 230. As indicated, the end cap 250 may be secured to the end piece 110 with a fastener 295. As shown in block 550, the method includes removing the beam structure 100 and the mandrel 400 from one another. Sequence of blocks 540, 545 and 550 can be different, depending on specifics of manufacturing implementation.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

Those of skill in the art will appreciate that various example embodiments are shown and described herein, each having certain features in the particular embodiments, but the present disclosure is not thus limited. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

What is claimed is:

1. A method of manufacturing a composite beam structure,
wherein the composite beam structure comprises:
an end piece having an axis, an end piece outer periphery surface, and an end piece mating end defining an end piece axial boundary,
wherein the end piece has an outwardly facing surface that is continuous about its perimeter in a circumferential direction, wherein wedge-shaped inner locking features extend radially outward from said outwardly facing surface, wherein the wedge-shaped inner locking features that are formed at the end piece mating end and are spaced apart from one another in the circumferential direction;

wherein, in the hoop direction along the end piece axial boundary, the end piece is continuous about its perimeter between the wedge-shaped inner locking features; and a composite tube configured to surround at least a portion of the end piece mating end to form a beam joint, wherein wedge-shaped imprints are formed through the composite tube, corresponding to the wedge-shaped inner locking features, wherein the wedge-shaped imprints define respective composite tube wedge-shaped depression surfaces about a composite tube inner periphery and composite tube wedge-shaped boss surfaces about a composite tube outer periphery, and wherein the wedge-shaped inner locking features of the end piece are covered by the composite tube wedge-shaped depression surfaces, wherein:

each of the wedge-shaped inner locking features is triangular having a vertex surface portion that is disposed along the axis and is directed away from the end piece axial boundary at the end piece mating end;

each of the wedge-shaped inner locking features is configured as an isosceles triangle, oriented such that it is bisected by the axis to define first and second triangular surfaces, the method comprising:

positioning the end piece on the mandrel, wherein the end piece has the axis, the end piece outer periphery surface, and the end piece mating end, wherein the end piece includes the wedge-shaped inner locking features that are formed to project outwardly from the end piece outer periphery surface at the end piece mating end and are spaced apart from one another; and positioning the composite tube on the mandrel so that the composite tube surrounds at least the portion of the end piece mating end to form the beam joint;

clamping the composite tube against the end piece mating end to form the wedge-shaped imprints through the composite tube, corresponding to the wedge-shaped inner locking features on the end piece mating end, wherein the wedge-shaped imprints respectively define the composite tube wedge-shaped depression surfaces about the composite tube inner periphery and composite tube wedge-shaped boss surfaces about the composite tube outer periphery, and wherein the wedge-shaped inner locking features of the end piece are covered by the composite tube wedge-shaped depression surfaces; and removing the composite beam structure and the mandrel from one another upon curing for thermoset or solidifying for thermoplastic composite materials, respectively.

2. The method of claim 1, further comprising securing an end cap to the end piece so that wedge-shaped outer locking features of the end cap are configured to abut adjacent ones of the composite tube wedge-shaped boss surfaces, wherein the wedge-shaped outer locking features are connected to one another by a collar portion of the end cap.

3. The method of claim 2, wherein positioning the composite tube on the mandrel includes:
positioning an insert over the mating end of the end piece;

forming the composite tube over the mandrel and the insert; and removing the insert prior to clamping the composite tube against the end piece mating end.

4. A composite beam structure comprising:

an end piece having an axis, an end piece outer periphery surface, and an end piece mating end defining an end piece axial boundary, wherein the end piece has an outwardly facing surface that is continuous about its perimeter in a circumferential direction, wherein wedge-shaped inner locking features extend radially outward from said outwardly facing surface, wherein the wedge-shaped inner locking features that are formed at the end piece mating end and are spaced apart from one another in the circumferential direction;

wherein, in the hoop direction along the end piece axial boundary, the end piece is continuous about its perimeter between the wedge-shaped inner locking features; and a composite tube configured to surround at least a portion of the end piece mating end to form a beam joint, wherein wedge-shaped imprints are formed through the composite tube, corresponding to the wedge-shaped inner locking features, wherein the wedge-shaped imprints define respective composite tube wedge-shaped depression surfaces about a composite tube inner periphery and composite tube wedge-shaped boss surfaces about a composite tube outer periphery, and wherein the wedge-shaped inner locking features of the end piece are covered by the composite tube wedge-shaped depression surfaces, wherein:

each of the wedge-shaped inner locking features is triangular having a vertex surface portion that is disposed along the axis and is directed away from the end piece axial boundary at the end piece mating end;

each of the wedge-shaped inner locking features is configured as an isosceles triangle, oriented such that it is bisected by the axis to define first and second triangular surfaces.

5. The composite beam structure of claim 4, wherein the end piece and the composite tube are formed of different materials.

6. The composite beam structure of claim 4, wherein the end piece is formed of metal or alloy or their combination.

7. The composite beam structure of claim 4, wherein the end piece and the composite tube each have circular cross-sections.

8. The composite beam structure of claim 4, wherein the end piece and the composite tube each have polygonal cross-sections.

9. The composite beam structure of claim 4, wherein:

the end piece extends from the end piece mating end to an axial exterior end; and a mechanical connector is secured to the axial exterior end.

10. The composite beam structure of claim 4, wherein the composite tube is formed of a material selected from one or more reinforced carbon, glass, and organic fibers or their combination, within a thermoset or a thermoplastic polymeric matrix.

11. A composite beam structure comprising:
an end piece having an axis, an end piece outer periphery surface, and an end piece mating end defining an end piece axial boundary,
wherein the end piece has an outwardly facing surface that is continuous about its perimeter in a circumferential direction, wherein wedge-shaped inner locking features extend radially outward from said outwardly facing surface, wherein the wedge-shaped inner locking features that are formed at the end piece mating end and are spaced apart from one another in the circumferential direction;
wherein, in the hoop direction along the end piece axial boundary, the end piece is continuous about its perimeter between the wedge-shaped inner locking features; and
a composite tube configured to surround at least a portion of the end piece mating end to form a beam joint,
wherein wedge-shaped imprints are formed through the composite tube, corresponding to the wedge-shaped inner locking features,
wherein the wedge-shaped imprints define respective composite tube wedge-shaped depression surfaces about a composite tube inner periphery and composite tube wedge-shaped boss surfaces about a composite tube outer periphery, and
wherein the wedge-shaped inner locking features of the end piece are covered by the composite tube wedge-shaped depression surfaces,
wherein the composite beam structure further comprises:
an end cap that is secured to the composite tube outer periphery of the composite tube at the beam joint, wherein:
the end cap is formed with wedge-shaped outer locking features connected to one another by a collar portion; and
the wedge-shaped outer locking features are configured to abut adjacent ones of the composite tube wedge-shaped boss surfaces.

12. The composite beam structure of claim 11, wherein the end cap is formed from metal or alloy or their combination.

13. The composite beam structure of claim 12, wherein the end cap is fastened to the end piece at a location that is spaced apart from the end piece mating end.

14. The composite beam structure of claim 13, wherein the end cap is fastened to the end piece with fasteners.

15. The composite beam structure of claim 11, wherein the wedge-shaped outer locking features define an end cap outer boundary of the end cap so that the end cap is discontinuous in the circumferential direction about its perimeter along the beam joint.

16. The composite beam structure of claim 11, wherein the end cap is continuous around its perimeter along the beam joint and has a complementary cross section shape to the composite tube outer periphery about the beam joint.

17. The composite beam structure of claim 16, wherein the wedge-shaped inner locking features define the end piece axial boundary along the beam joint.

18. The composite beam structure of claim 11, wherein the wedge-shaped inner locking features define the end piece axial boundary along the beam joint.

19. A method of manufacturing a composite beam structure,
wherein the composite beam structure comprises:
an end piece having an axis, an end piece outer periphery surface, and an end piece mating end defining an end piece axial boundary,
wherein the end piece has an outwardly facing surface that is continuous about its perimeter in a circumferential direction, wherein wedge-shaped inner locking features extend radially outward from said outwardly facing surface, wherein the wedge-shaped inner locking features that are formed at the end piece mating end and are spaced apart from one another in the circumferential direction;
wherein, in the hoop direction along the end piece axial boundary, the end piece is continuous about its perimeter between the wedge-shaped inner locking features; and
a composite tube configured to surround at least a portion of the end piece mating end to form a beam joint,
wherein wedge-shaped imprints are formed through the composite tube, corresponding to the wedge-shaped inner locking features,
wherein the wedge-shaped imprints define respective composite tube wedge-shaped depression surfaces about a composite tube inner periphery and composite tube wedge-shaped boss surfaces about a composite tube outer periphery, and
wherein the wedge-shaped inner locking features of the end piece are covered by the composite tube wedge-shaped depression surfaces,
wherein the composite beam structure further comprises:
an end cap that is secured to the composite tube outer periphery of the composite tube at the beam joint, wherein:
the end cap is formed with wedge-shaped outer locking features connected to one another by a collar portion; and
the wedge-shaped outer locking features are configured to abut adjacent ones of the composite tube wedge-shaped boss surfaces,
the method comprising:
positioning the end piece on the mandrel, wherein the end piece has the axis, the end piece outer periphery surface, and the end piece mating end, wherein the end piece includes wedge-shaped inner locking features that are formed to project outwardly from the end piece outer periphery surface at the end piece mating end and are spaced apart from one another; and
positioning the composite tube on the mandrel so that the composite tube surrounds at least the portion of the end piece mating end to form the beam joint;
clamping the composite tube against the end piece mating end to form the wedge-shaped imprints through the composite tube, corresponding to the wedge-shaped inner locking features on the end piece mating end, wherein the wedge-shaped imprints respectively define composite tube wedge-shaped depression surfaces about the composite tube inner periphery and composite tube wedge-shaped boss surfaces about the composite tube outer periphery, and wherein the wedge-shaped inner locking features of the end piece are covered by the composite tube wedge-shaped depression surfaces; and
removing the composite beam structure and the mandrel from one another upon curing for thermoset or solidifying for thermoplastic composite materials, respectively.

20. The method of claim 19, further comprising
securing the end cap to the end piece so that the wedge-shaped outer locking features of the end cap are configured to abut adjacent ones of the composite tube wedge-shaped boss surfaces.

21. The method of claim 20, wherein
positioning the composite tube on the mandrel includes:
  positioning an insert over the mating end of the end piece;
  forming the composite tube over the mandrel and the insert; and
  removing the insert prior to clamping the composite tube against the end piece mating end.

* * * * *